Patented July 8, 1952

2,602,721

UNITED STATES PATENT OFFICE 2,602,721

PROCESSES FOR MAKING CERTAIN HYDROLYZED 2,3 - DICYANO - ANTHRAQUINONE DYESTUFFS AND DISPERSE DYE COMPOSITIONS COMPRISING THEM

Victor S. Salvin, Irvington, and Anthony B. Conciatori, Chatham, N. J., assignors to Celanese Corporation of America, New York, N. Y., a corporation of Delaware No Drawing. Application June 30, 1950, Serial No. 171,546

12 Claims. (Cl. 8—40)

This invention relates to the production of dyestuffs, and relates more particularly to an improved process for the treatment of anthraquinone dyestuffs containing the cyano group as a substituent whereby a controlled hydrolysis of said dyestuffs may be achieved and products having an improved affinity for cellulose acetate or other organic derivative of cellulose textile materials obtained.

An object of this invention is the provision of an improved process for the controlled hydrolysis of anthraquinone dyestuffs containing a cyano group as a substituent on the anthraquinone nucleus.

Another object of this invention is to provide a process for the treatment of anthraquinone dyestuffs containing a nuclear cyano group by a hydrolysis reaction whereby said dyestuffs are modified and are given an increased degree of affinity for cellulose acetate or other organic derivatives of cellulose textile materials.

A further object of this invention is the production of improved dyestuff disperse powders of hydrolyzed cyano-anthraquinone dyestuffs.

Other objects of this invention will appear from the following detailed description.

The controlled hydrolysis of certain cyano-anthraquinone dyestuffs dyeing cellulose acetate or other organic derivative of cellulose textile materials in desirable blue shades has been found to yield modified dyestuffs which are improved with respect to both their affinity for said textile materials and their resistance to acid-fading. A manner in which such controlled hydrolysis may be effected is described in U. S. Patent No. 2,496,414 and the process comprises subjecting the cyano-anthraquinone dyestuff to hydrolysis at a temperature of 140 to 150° C. under autogenous pressure in a buffered aqueous hydrolysis medium maintained at a pH of 8 to 9. This method of hydrolysis is quite practical for those dyestuffs having a melting point below the temperature to which they are heated in effecting the desired hydrolysis. In the case of dyestuffs whose melting point is about 140 to 150° C., hydrolysis is not satisfactorily effected by the above method because of the fact that the dyestuff does not melt and the reaction mixture remains substantially heterogeneous. The use of higher temperatures to overcome this difficulty is not a satisfactory solution since higher temperatures greatly increase the velocity of the reaction and make suitable control so difficult that an excessive degree of hydrolysis is substantially unavoidable. Excessive hydrolysis leads to the formation of dyestuffs yielding reddish blue shades which show poor gas fading resistance.

We have now found that the advantageous results obtained by effecting a controlled hydrolysis of cyano-anthraquinone dyestuffs may be attained more conveniently and without the use of higher temperatures and pressures if said cyano-anthraquinone dyestuffs are first reduced to the leuco form in an aqueous medium and the hydrolysis of the leuco dyestuffs then effected with said aqueous medium maintained in an alkaline condition and at a temperature of 40 to 100° C.

The cyano-anthraquinone dyestuffs may be reduced to the leuco form by vatting said dyestuffs in an aqueous solution of sodium hydrosulfite which is maintained at the desired alkalinity by adding an alkaline material such as sodium carbonate, tetrapotassium pyrophosphate or mixtures of sodium carbonate and tetrapotassium pyrophosphate thereto. Advantageously, a dispersing agent may also be present in the aqueous medium in which the vatting is carried out.

Thus, about 10 to 30 parts by weight of the cyano-anthraquinone dyestuffs may be added to about 200 parts by weight of an aqueous solution containing 10 to 30 parts by weight of sodium hydrosulfite, 10 to 30 parts by weight of the alkaline material, and 1 to 2 parts by weight of a suitable detergent, such as a long chain sulfated aliphatic alcohol, sodium alkyl aryl sulfonate, or a non-ionic detergent such as a polyoxyethylene alcohol or ester, and the resulting mixture warmed to a temperature of 40 to 100° C. so as to vat the dyestuff and reduce it to the leuco form. After the dyestuff has been vatted, the vat, containing the leuco dyestuff partly in suspension and partly in solution, is then maintained at a temperature of 40 to 100° C. for 30 to 120 minutes to effect the desired hydrolysis. The hydrolyzed leuco dyestuff obtained is then oxidized back to the colored form by aerating the reaction mixture. The hydrolyzed dyestuff is rendered insoluble upon oxidation and may then be separated from the aqueous medium by filtration. The hydrolyzed cyano-anthraquinone dyestuffs obtained by this novel method exhibit an improved affinity for cellulose acetate or other organic derivatives of cellulose textile materials without any appreciable loss in the resistance which said dyed materials exhibit toward gas fading.

While the filtration of the hydrolyzed and oxidized cyano-anthraquinone dyestuffs provides a suitable method for the separation of said modified dyestuffs from the aqueous medium in which the hydrolysis is effected so that said dyestuffs may be employed for dyeing operations in conjunction with suitable dispersing agents, we have also found that such separation is not necessary in order to incorporate said modified dyestuffs in dispersing dyestuff compositions which may be employed for the dyeing of textile materials.

We have found that by incorporating both lignin sulfonate and a neutral or alkaline inorganic salt of a mono-valent cation which does not form an insoluble soap in the aqueous medium in which the vatting, hydrolysis and subsequent oxidation is effected, and then milling the mixture obtained, desirable disperse dyestuff powders of very finely-divided and easily dispersible particle size are formed. Since the hydrolyzed cyanoanthraquinone dyestuff need not be isolated from the reaction medium in order to form highly satisfactory disperse dyestuff compositions, an important advantage is gained.

An additional advantage is gained when the reduction of the cyano-anthraquinone dyestuff to the leuco form is followed by the hydrolysis and oxidation of the dyestuff, with all of said steps being carried out in the presence of lignin sulfonate as the dispersing agent, in that the dyestuff disperse powders which are obtained contain the dyestuff particles in an extremely finely-divided form. The finely-divided form of said particles is a result of the chemical reduction which takes place on conversion of the cyano-anthraquinone dyestuff to the leuco form followed by hydrolysis and sebsequent oxidation to the insoluble oxidized form. Upon being oxidized to the insoluble form in the presence of the lignin sulfonate dispersing agent, the small insoluble particles of oxidized dyestuff which form as oxidation takes place, immediately become encapsulated by the lignin sulfonate and are thus prevented from agglomerating and growing in size. The milling operation which is usually carried out after oxidation is completed further decreases the initially fine particle size achieved by our process.

As examples of the neutral or alkaline inorganic salts of mono-valent cations which do not form insoluble soaps which may be employed in the modification of our process which is described above, there may be mentioned sodium sulfate, sodium phosphate, potassium chloride, lithium nitrate, potassium thiocyanate or tetrapotassium pyrophosphate. The presence of said salts in the composition not only increases the dispersing efficiency of the lignin sulfonate but also reduces the solubility of the dyestuffs in the lignin sulfonate and prevents the formation of low-melting disperse powder dyestuff compositions. The lignin sulfonate appears in the final disperse dyestuff composition, as indicated above, as a coating or encapsulating film on the surface of the finely-divided dyestuff particles which enables the latter to be wet out instantaneously and completely when the disperse powder is placed in water.

Various cyano-substituted anthraquinone dyestuff may be treated in accordance with our novel process. As examples of said dyestuffs, there may be mentioned 1-amino-2(3)-cyano-4-alkylamino-anthraquinones and the novel cyano-anthraquinone dyestuffs disclosed and claimed in co-pending application Ser. No. 115,768, filed September 14, 1949, now Pat. No. 2,573,732. Particularly valuable results are obtained when treating the latter dyestuffs which are of the general formula

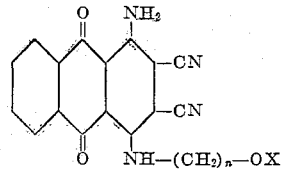

wherein $n$ is an integer of up to about 5 and X is an alkyl or hydroxyalkyl group.

In order further to illustrate our invention but without being limited thereto the following examples are given:

*Example I*

10 parts by weight of 1-amino-2,3-dicyano-4-β-methoxy-ethylamino-anthraquinone melting at about 206–9° C. are added to 200 parts by weight of water containing 10 parts by weight of sodium hydrosulfite and 10 parts by weight of sodium carbonate. One part by weight of sodium lauryl sulfate is added and the suspension obtained is heated to 70° C. to form a brown vat of the anthraquinone dyestuff in the leuco form. A part of the vatted leuco dyestuff is in solution and the remainder is in suspension in the vat. The suspension-solution of the leuco vat dyestuff is maintained at 70° C. for about 60 minutes with occasional stirring. At the end of the 60 minute period, the desired hydrolysis is complete. The reaction mixture is then aerated by bubbling a stream of air through this liquid until the hydrolyzed dyestuff is converted to the oxidized form and precipitates from solution. The suspension is then filtered and 9 parts by weight of a dry filter cake of partially hydrolyzed 1-amino-2,3-dicyano-4-β-methoxy-ethylamino anthraquinone is obtained, the product melting at about 169–75° C.

*Example II*

10 parts by weight of 1-amino-2(3)-cyano-4-butylamino-anthraquinone, having a melting point of 125–135° C. are suspended in 200 parts by weight of water containing 10 parts by weight of sodium hydrosulfite and 10 parts by weight of sodium carbonate and then 1 part by weight of sodium lauryl sulfate is added. The reaction mixture, containing the vatted dyestuff, is then heated and maintained at 80–85° C. for two hours to effect the desired hydrolysis. At the end of the two hour heating period the hydrolyzed reaction mixture is aerated to oxidize the hydrolyzed leuco vat dyestuff and to precipitate it from solution. The precipitated hydrolyzed dyestuff is filtered off and dried. 8 parts by weight of partially hydrolyzed 1-amino-2(3)-cyano-4-butyl-amino-anthraquinone are obtained melting at from 120–130° C. The dyestuff obtained dyes cellulose acetate materials in heavier shades than the unhydrolyzed dyestuff from a dyebath of equal dyestuff concentration. Only a slight decrease in resistance to gas fading is imparted to the dyestuff by the hydrolysis.

*Example III*

10 parts by weight of 1-amino-2,3-dicyano-4-β-methoxy-ethylamino-anthraquinone are slurried in a solution of 10 parts by weight of lignin sulfonate, 5 parts by weight of tetrapotassium pyrophosphate and 5 parts by weight of sodium carbonate in 250 parts by weight of water. A solution of 10 parts by weight of sodium hydrosulfite in 100 parts by weight of water is then added and the resulting mixture heated to 70° C. for one hour. The hydrolyzed reaction mixture is then placed in a ball mill and milled with pebbles for 12 hours. The milled hydrolyzed leuco dyestuff is then oxidized by aerating the reaction mixture for about 1 hour and the precipitated dyestuff further milled for about 4 hours. The solid phase is isolated from the liquid by drying. The dyestuff disperse powder obtained exhibits excellent dyeing properties and is capable of dyeing cellulose acetate materials in considerably deeper shades than the unhydrolyzed dyestuff. The dyed textile materials have a resistance to gas fading of 2 units in accordance with the standard A. A. T. C. C. test. The unhydrolyzed dyestuff yields dyed materials having a resistance to gas fading of 3 units.

It has also been found that equally valuable results may be obtained when employing a ball milling procedure similar to that described above without the use of sodium hydrosulfite for vatting if the ball milling of the dyestuff is carried out in the presence of lignin sulfonate and the neutral or alkaline salt employing balls of iron, or an iron alloy, such as steel, for the milling step. The use of balls containing iron apparently results in the formation of certain ferrous salts which act to reduce the cyano-anthraquinone dyestuffs to the leuco form thus permitting the desired hydrolysis to take place when the temperature is maintained at from 30 to 45° C. during the milling operation. Aeration of the reaction mixture converts the dyestuff back to the insoluble oxidized form and, after filtration and drying, disperse dyestuff powders of excellent dyeing properties are obtained.

It is to be understood that the foregoing detailed description is given merely by way of illustration and that many variations may be made therein without departing from the spirit of our invention.

Having described our invention, what we desire to secure by Letters Patent is:

1. Process for the production of improved dyestuffs, which comprises reducing an anthraquinone dyestuff of the formula

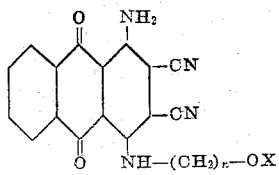

where $n$ is an integer of up to about 5 and $X$ is a member of the group consisting of alkyl and hydroxyalkyl groups, to the leuco form in an aqueous alkaline medium, and heating said aqueous alkaline medium until a hydrolysis of the leuco dye is effected.

2. Process for the production of improved dyestuffs, which comprises reducing an anthraquinone dyestuff of the formula

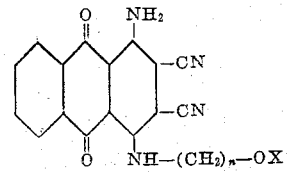

where $n$ is an integer of up to about 5 and $X$ is a member of the group consisting of alkyl and hydroxyalkyl groups, to the leuco form in an aqueous alkaline medium, and heating said aqueous alkaline medium to a temperature of 40 to 100° C. for 30 to 120 minutes whereby a hydrolysis of said dyestuff is effected.

3. Process for the production of improved dyestuffs, which comprises reducing an anthraquinone dyestuff of the formula

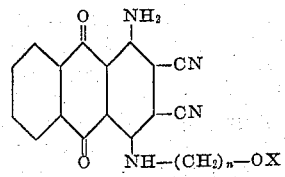

where $n$ is an integer of up to about 5 and $X$ is a member of the group consisting of alkyl and hydroxyalkyl groups, to the leuco form in an aqueous alkaline medium, and heating said aqueous alkaline medium to a temperature of 40° to 100° C. for 30 to 120 minutes whereby a hydrolysis of said dyestuff is effected and then separating the hydrolyzed dyestuff from the aqueous medium by oxidizing the same.

4. Process for the production of improved dyestuffs, which comprises heating 5 to 10 parts by weight of an anthraquinone dyestuff of the formula

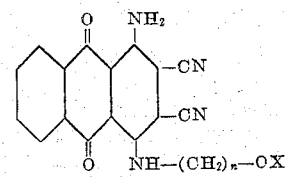

where $n$ is an integer of up to about 5 and $X$ is a member of the group consisting of alkyl and hydroxyalkyl groups, in 10 parts by weight of an aqueous solution containing 5 to 10 parts by weight of sodium hydrosulfite, 5 to 10 parts by weight of sodium carbonate and 5 to 10 parts by weight of a dispersing agent to vat the dyestuff to the leuco form, maintaining the reaction mixture containing the leuco dyestuff at a temperature of 40 to 100° C. for 30 to 120 minutes whereby a hydrolysis of said dyestuff is effected and then reoxidizing the hydrolyzed dyestuff in the aqueous medium by aerating the same.

5. Process for the production of a dyestuff of improved dyeing properties, which comprises heating 1-amino-2,3-dicyano-4-β-methoxy-ethyl-amino-anthraquinone in an aqueous alkaline solution of sodium hydrosulfite containing a dispersing agent to vat said dyestuff to the leuco form, and then heating the reaction mixture containing the leuco dyestuff at a temperature of 40 to 100° C. for 30 to 120 minutes whereby a hydrolysis of said dyestuff is effected.

6. Process for the production of a dyestuff of improved dyeing properties, which comprises heating 1-amino-2,3-dicyano-4-β-methoxy-ethyl-amino-anthraquinone in an aqueous alkaline solution of sodium hydrosulfite containing sodium carbonate and sodium lauryl sulfate to vat said dyestuff to the leuco form, heating the reaction mixture containing the leuco dyestuff at a temperature of 40 to 100° C. for 30 to 120 minutes whereby a hydrolysis of said dyestuff is effected, and then separating the hydrolyzed dyestuff from the aqueous medium by oxidizing the same.

7. Process for the production of disperse dyestuff compositions, which comprises reducing to the leuco form an anthraquinone dyestuff of the formula

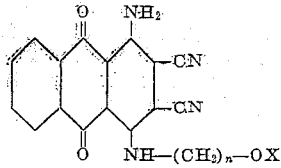

where $n$ is an integer of up to about 5 and X is a member of the group consisting of alkyl and hydroxyalkyl groups in an aqueous alkaline medium containing lignin sulfonate, a member of the group consisting of neutral and alkaline salts of monovalent cations which do not form insoluble soaps, heating the reaction mixture until a hydrolysis of the leuco dyestuff is effected, milling the reaction mixture, oxidizing the hydrolyzed leuco dyestuff to cause it to separate from the aqueous medium, and then removing at least a substantial proportion of the water present.

8. Process for the production of disperse dyestuff compositions, which comprises reducing to the leuco form an anthraquinone dyestuff of the formula

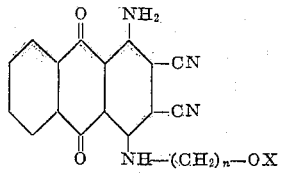

where $n$ is an integer of up to about 5 and X is a member of the group consisting of alkyl and hyrdroxyalkyl groups in an aqueous alkaline medium containing lignin sulfonate, sodium hydrosulfite and a member of the group consisting of neutral and alkaline salts of monovalent cations which do not form insoluble soaps, heating the reaction mixture until a hydrolysis of the leuco dyestuff is effected, milling the reaction mixture, oxidizing the hydrolyzed leuco dyestuff to cause it to separate from the aqueous medium, further milling the reaction mixture, and then removing at least a substantial proportion of the water present.

9. Process for the production of disperse dyestuff compositions, which comprises reducing to the leuco form an anthraquinone dyestuff of the formula

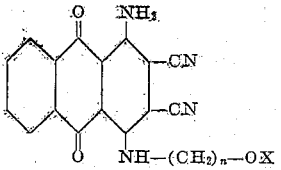

where $n$ is an integer of up to about 5 and X is a member of the group consisting of alkyl and hydroxyalkyl groups in an aqueous akaline medium containing lignin sulfonate, a member of the group consisting of neutral and alkaline salts of monovalent cations which do not form insoluble soaps, heating the reaction mixture at a temperature of 40 to 100° C. for 30 to 120 minutes until a hydrolysis of the leuco dyestuff is effected, milling the reaction mixture, oxidizing the hydrolyzed leuco dyestuff to cause it to separate from the aqueous medium, further milling the reaction mixture and then removing at least a substantial proportion of the water present.

10. Process for the production of a disperse dyestuff composition, which comprises reducing 1-amino-2,3-dicyano-4-β-methoxy - ethylamino-anthraquinone in an aqueous alkaline solution containing lignin sulfonate, a member of the group consisting of neutral and alkaline salts of monovalent cations which do not form insoluble soaps, sodium hydrosulfite and sodium carbonate, heating the reaction mixture until a hydrolysis of the leuco dyestuff is effected, oxidizing the hydrolyzed leuco dyestuff to cause it to separate from the aqueous medium and then removing at least a substantial proportion of the water present.

11. Process for the production of a disperse dyestuff composition, which comprises reducing 1-amino-2,3-dicyano-4-β-methoxy - ethylamino-anthraquinone in an aqueous alkaline solution, containing lignin sulfonate, a member of the group consisting of neutral and alkaline salts of monovalent cations which do not form insoluble soaps, sodium hydrosulfite and sodium carbonate, heating the reaction mixture at a temperature of 40 to 100° C. for 30 to 120 minutes until a hydrolysis of the leuco dyestuff is effected, milling the reaction mixture, oxidizing the hydrolyzed leuco dyestuff to separate it from the aqueous medium, further milling the reaction mixture and then removing at least a substantial proportion of the water present.

12. Process for the production of a disperse dyestuff composition, which comprises reducing 1-amino-2,3-dicyano-4-β-methoxy - ethylamino-anthraquinone in an aqueous alkaline solution containing lignin sulfonate, tetrapotassium pyrophosphate, sodium hydrosulfite and sodium carbonate, heating the reaction mixture at a temperature of 40 to 100° C. for 30 to 120 minutes until a hydrolysis of the leuco dyestuff is effected, milling the reaction mixture, oxidizing the hydrolyzed leuco dyestuff to cause it to separate from the aqueous medium, further milling the reaction mixture and then removing at least a substantial proportion of the water present.

VICTOR S. SALVIN.
ANTHONY B. CONCIATORI.

No references cited.